Nov. 6, 1956  W. R. COMBER  2,769,473

VEGETABLE PEELER HAVING A REVERSING SWITCH

Filed May 17, 1954 2 Sheets-Sheet 1

Inventor
William R. Comber

Florian G. Miller
Attorney

Nov. 6, 1956  W. R. COMBER  2,769,473
VEGETABLE PEELER HAVING A REVERSING SWITCH
Filed May 17, 1954  2 Sheets-Sheet 2
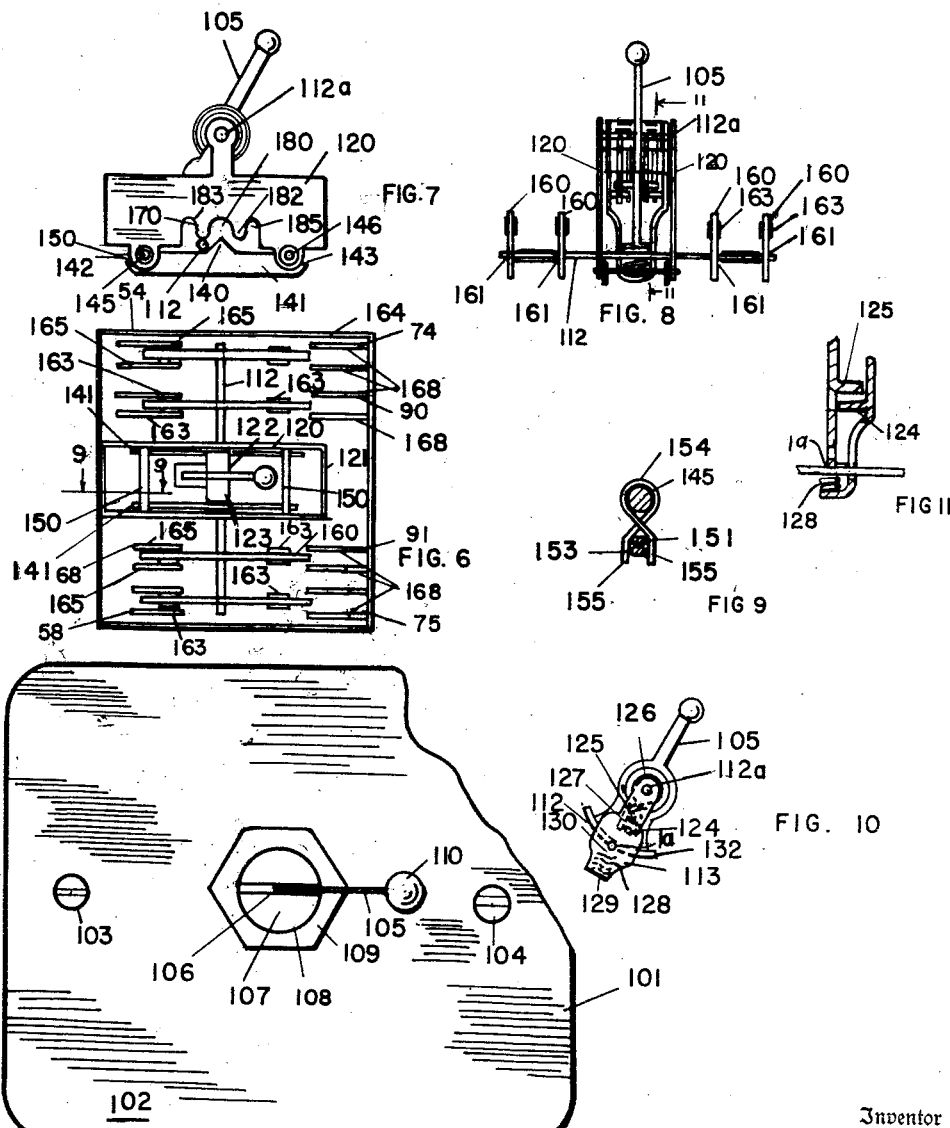
Inventor
WILLIAM R. COMBER
Attorney United States Patent Office 2,769,473
Patented Nov. 6, 1956

2,769,473
VEGETABLE PEELER HAVING A REVERSING SWITCH

William R. Comber, Erie, Pa., assignor to Champion Dish Washing Machine Company, Erie, Pa., a corporation of Pennsylvania Application May 17, 1954, Serial No. 430,014

1 Claim. (Cl. 146—49)

This invention relates generally to vegetable peelers and more particularly to vegetable peelers having a rotatable disk with an abradant surface.

This application is a continuation in part of application Serial No. 190,832, filed October 18, 1950, now abandoned.

Vegetable peelers are frequently made with a rotatable abrasive disk with a series of rises or waves thereon in a container to agitate the vegetables to change their positions so that successively different portions of the exterior of the vegetables are exposed to the abrading action of the disk and of the wall of the container whereby the peel is removed from vegetables. It has been found that with the disk rotating at approximately two hundred fifty R. P. M.'s, the vegetables move upwardly on the leading side of the crest on the disk but they do not fall fast enough to contact the receding side of the crest. After the vegetables move over the crest, they fall in the trough or valley between the crests after jumping the receding side of the crest. The result has been the wearing of but one side of the crests on the disk inasmuch as present disks move in one direction of rotation, thereby materially shortening the life of the disk and materially decreasing the efficiency of the vegetable peeler.

When a reversible alternating current motor is connected to the power line by means of a switch which will reverse the current to the armature without first allowing the motor to slow down when the current to the motor is reversed, the motor will continue to operate in the same direction and will not reverse. In the case of a peeler, if the operator reversed the current by operating a reversing switch, the motor would not reverse when the switch was moved from one position to another and, therefore, the disk would be constantly driven in one direction and the ridges on the disk would continue to wear on one side thereof only.

I have discovered that when a peeler is driven by a reversible motor and the motor is connected with my novel switch such as I disclose hereinafter, the operator is prevented from moving the switch from one extreme position to the other before the motor has slowed down. It is a well known fact that a single phase motor will not reverse when the electric current thereof is reversed with the motor running at full speed. My novel switch makes it necessary for the operator to pause in the zero position before moving the switch on through to the other position. This pause gives the motor time to slow down sufficiently to cause it to reverse and exert a torque in the opposite direction when the current to the motor is reversed.

It is, accordingly, an object of my invention to overcome the above and other defects in vegetable peelers and it is more particularly an object of my invention to provide a vegetable peeler of the type having a reversible disk which is simple in construction, economical in cost, economical in manufacture, and efficient in operation.

Another object of my invention is to provide a novel means for controlling the operation of an abradant disk for peeling vegetables in a vegetable peeler relying on the law of averages to rotate the disk equally in opposite directions to double the life thereof.

Another object of my invention is to provide a novel electrical control system for a reversible motor in a vegetable peeler for selectively operating a reversible abradant disk in a clockwise or a counterclockwise direction.

With the above and other objects in view, the present invention consists of the combination and arrangement of parts hereinafter more fully described, illustrated in the accompanying drawings and more particularly pointed out in the appended claim, it being understood that changes may be made in the form, size, proportions, and minor details of construction without departing from the spirit or sacrificing any advantages of the invention.

In the drawings:

Fig. 5 is a front view of my novel switch;

Fig. 6 is a top view of the switch with the cover removed;

Fig. 7 is a side view of an element of the switch;

Fig. 8 is an end view of the operating mechanism of my switch;

Fig. 9 is a cross section of the view taken on line 9—9 of Fig. 6;

Fig. 10 is a detailed view of one of the elements of the switch; and

Fig. 11 is a view taken on line 11—11 of Fig. 8.

Figure 1:
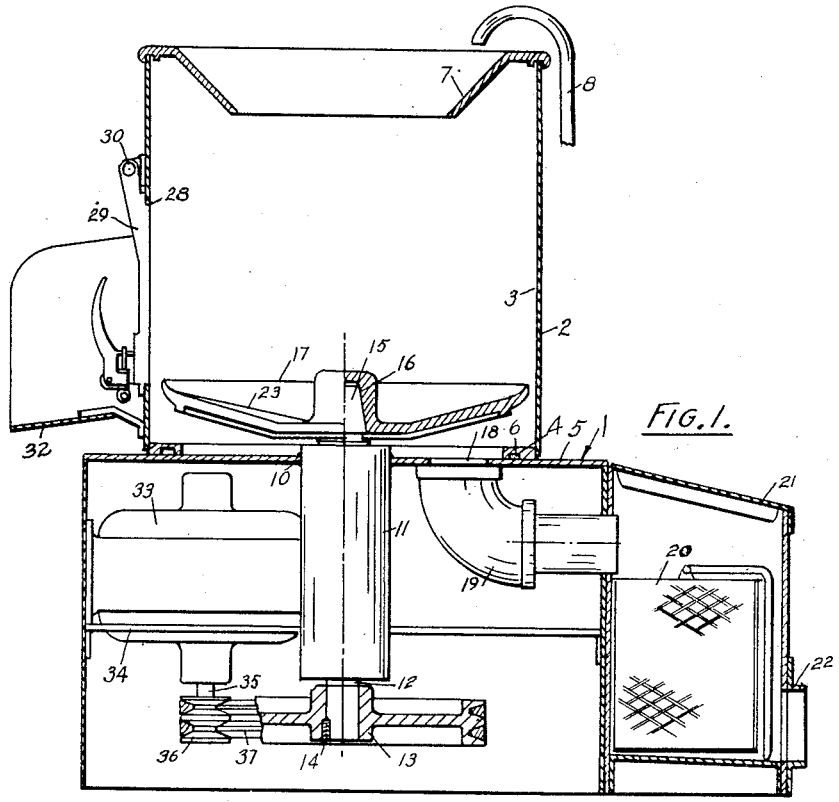
Fig. 1 is a more or less diagrammatic vertical sectional view through my novel vegetable peeler.
Figure 2:
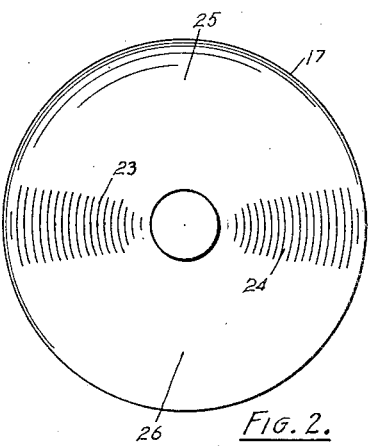
Fig. 2 is a plan view of the disk used in my novel vegetable peeler.

Referring now to the drawings, I show in Figs. 1 and 2 a box shaped support member 1 which may be disposed on a table or floor or to which legs (not shown) may be added. An open cylindrical container 2, preferably having an abradant surface 3 on the inner periphery thereof, is welded to an annular ring member 4 which is secured to the top 5 of the box shaped support member 1 by screw members 6. An inwardly tapered flanged member 7 is seated on the upper end of the container 2. A conventional goose necked water line 8 provides water for the vegetables in the container 2. The top 5 of the support member 1 has a centrally disposed aperture 10 through which extends a cylindrical housing 11 containing conventional thrust bearings (not shown) for vertically supporting a drive shaft 12. The drive shaft 12 has a double grooved pulley 13 fixed to the lower end thereof by a locking screw 14. The shaft 12 has a tapered head 15 on the upper end thereof for receiving the correspondingly tapered recess 16 of a disk 17 mounted for horizontal rotative movement in the bottom of the container 2. The head 15 is preferably rectangular in cross section. The outer sides of the disk 17 are spaced in predetermined distance from the inner sides of the member 2. The top 5 of the support 1 has an outlet 18 on one side of the aperture 10 to which is connected a pipe connection 19 leading to a conventional peel trap 20 disposed in a housing 21 adjacent the support member 1. The housing 21 has a suitable outlet 22 and a removable cover. The container 2 has a laterally extending outlet 28 which is closed by a latched door 29, the door 29 being hinged at 30. An angularly disposed drainboard 32 is disposed externally of the outlet 28 on the outer side of the container 2.

The disk 17 is slightly cup shaped and it has radially extending rounded crests 23 and 24 preferably one hundred eighty degrees apart. The upper side of the disk 17 is covered with a suitable abrasive material such as a fused silicon carbide abrasive, a cemented carborundum grit, or an abrasive surface formed by special blasting and spraying processes. The crests 23 and 24 have troughs 25 and 26 therebetween defining continuous waves to agitate the vegetables in the container 2 being peeled to change the positions of the vegetables so that successively different parts thereof are exposed to the abrasive action of the disk 17 and of the inner wall 3 of the container 2. The opposite lateral margins of the crests 23 and 24 are uniformly curved and merge into the contour lines of the reversely curved valleys or troughs 25 and 26 between the crests 23 and 24. The curves on opposite sides of the crest 23 and 24 are equal and are gradually upwardly and downwardly extending curves.

For operating my novel disk 17 in either a forward or a reverse direction, I preferably provide a capacitor type motor 33 supported by a bracket 34 in the box shaped support member 1. Any suitable reversible type motor may be utilized. The motor 33 powers a vertically extending shaft 35 with a double grooved pulley 36 mounted thereon. Belts 37 are trained over the pulleys 13 and 36 to transfer rotative force from the motor 33 to the disk 17. The belts 37 are preferably standard V-belts which assure a noiseless and dependable drive.

Figure 3:
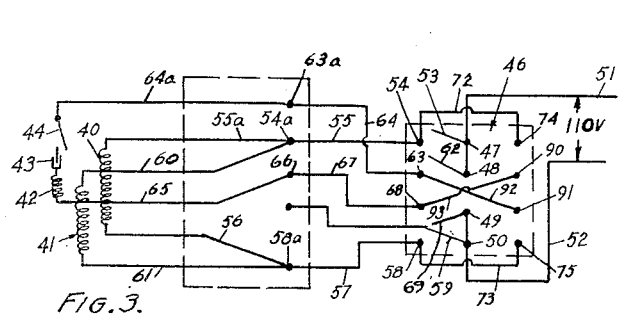
Fig. 3 is a schematic view of the wiring diagram for use on a one hundred ten volt line for my novel vegetable peeler with the field coil of the motor and starting winding connected in parallel and to reversing cross wires in a control switch to reverse the field of the starting winding which reverses the rotation of the motor shaft.

The motor 33 is designed to operate on any one of the conventional types of electrical power supply lines; namely, one hundred ten volt, two hundred twenty volt single phase, or two legs of two hundred twenty volt three phase. This requires six terminals (not shown) on the motor. The diagram shown in Fig. 3 shows field coils 40 and 41 of a conventional capacitor type motor 33. A starting winding 42 is connected across the line leading to the field coils 40 and 41 in series with a condenser 43 and a switch 44 for cutting out the starting winding 42 after the motor 33 is started. The switch 44 is only closed while the motor 33 is starting. The effect of the condenser 43 is to throw the current and flux in the starting coil 42 out of phase with the main field coils 40 and 41, thereby causing the resultant field to rotate and a torque to be produced. This is conventional starting. The diagram in Fig. 3 shows my novel arrangement connected for operation on a one hundred ten volt line. A double throw switch 46 has four poles 47, 48, 49, and 50, the outer poles 47 and 50 being connected to power lines 51 and 52. When the switch 46 is thrown to the left as shown in the drawings, a circuit is completed to field coil 40 through power line 51, pole 47, switch blade 53, terminal 54, wire 55, terminal 54a, wire 55a, field coil 40, wire 56, terminal 58a, wire 57, terminal 58, switch blade 59, and pole 50 to power line 52. The circuit to the field coil 41 is power line 51, pole 47, switch blade 53, terminal 54, wire 55, terminal 54a, wire 60, coil 41, wire 61, terminal 58a, wire 57, terminal 58, switch blade 59, and pole 50 to the power line 52. The circuit to the starting winding 42 when the switch 44 is closed is from the power line 51, pole 48, switch blade 62, terminal 63, wire 64, terminal 63a, wire 64a, switch 44, condenser 43, winding 42, wire 65, terminal 66, wire 67, terminal 68, switch blade 69, and pole 49 to the power line 52. The terminals 54 and 58 of the switch 46 are connected by wires 72 and 73, respectively, to the terminals 74 and 75 on the opposite side of the switch 46 and the terminals 63 and 68 are connected to terminals 91 and 90 by cross wires 92 and 93, respectively. It will be evident upon inspection that when the switch 46 is thrown to the right, the blades 53, 62, 69, and 59 will bridge poles 47, 48, 49, and 50 and terminals 74, 90, 91, and 75, respectively, and the circuit will follow through the wires 72, 73, 92, and 93 to the terminals 54, 63, 68, and 58 and through the wiring system heretofore described. The field of the starting winding 42 will be reversed because the reversing cross wires 92 and 93 in the switch 46 change the direction of the current to the starting winding 42 and, thereby, move the motor 33 in a reverse direction when the double throw switch 46 is thrown to the right. It has been found that the switch 46 is thrown as many times to the left as it is thrown to the right due to the law of averages, thereby resulting in the operation of the disk 17 equally in a clockwise and counterclockwise direction.

Figure 4:
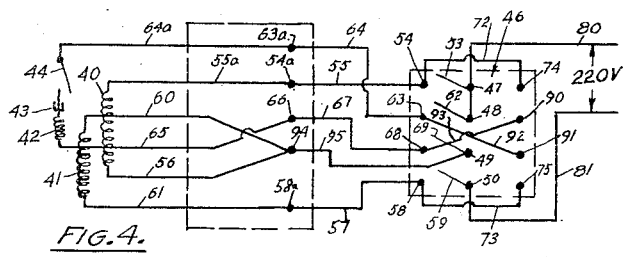
Fig. 4 is a schematic wiring diagram the same as that shown in Fig. 3 with a slight modification to make it adaptable for use on a two hundred twenty volt line, the modification placing the field coils in series and the starting winding connected to a point between the coils and one leg of the power line.

In Fig. 4, I show the same circuit as in Fig. 3 except that three leads are changed as will be evident upon inspection to adapt the wiring system shown in Fig. 3 for connection to a two hundred twenty volt power line. The only change required is the connection of the wires 56 and 60 to terminal 94 instead of to terminals 58a and 54a and the elimination of the jumper lead between the poles 49 and 50. In this system, the field coils 40 and 41 are connected in series and the starting winding 42 is connected to a point between the coils 40 and 41 and one leg of the power line. The circuit for the coil 40 when the switch 46 is thrown to the left comprises a power line 80 connected to the outer pole 47 of the switch 46, the switch blade 53, terminal 54, wire 55, terminal 54a, wire 55a, coil 40, wire 56, terminal 94, wire 60, coil 41, wire 61, terminal 58a, wire 57, terminal 58, blade 59, and pole 50 to the power line 81. The circuit for the starting winding 42 comprises power line 80, pole 48, switch blade 62, terminal 63, wire 64, terminal 63a, wire 64a, switch 44, condenser 43, starting winding 42, wire 65, terminal 66, wire 67, terminal 68, switch blade 69, pole 49, wire 95, terminal 94, which is the common terminal of the two running coils 40 and 41, wire 60, coil 41, wire 61, terminal 58a, wire 57, terminal 58, switch blade 59, pole 50, and power line 81. When the blades 53, 62, 69, and 59 of the switch 46 are thrown to the right opposite to the position shown in Fig. 4, they bridge the poles 47, 48, 49, and 50 and the terminals 74, 90, 91, and 75, respectively. The terminals 74 and 75 are connected by the wires 72 and 73 to the terminals 54 and 58, respectively, and the terminals 63 and 68 are connected to the terminals 91 and 90, respectively, by reversing cross wires 92 and 93, thereby causing the power from the circuit to reverse in starting winding circuit to reverse the field in the starting winding 42 and reverse the direction of rotation of the motor 33 when the switch 46 is thrown to the right.

In Figs. 5, 6, 7, 8, 9, and 10, I disclose a novel switch which I use with my novel peeler. The switch is preferably contained in a case 101 having the cover 102 secured thereon by screws 103 and 104. The switch lever 105 is swingably operable in the slot 106 of the threaded member 107. The member 107 has external threads 108 which support the locking nut 109 for supporting the switch to the cover 102. Switch lever 105 has a ball shaped handle 110 for convenience in operation of the lever.

The lever 105 is pivoted on the axle 112a which extends transversely of the switch and supports the lever 105. The actuating member 113 is likewise pivoted on the axle 112a between the side frame members 120 and is swingable on the axle 112. The member 113 is generally U-shaped and has inwardly struck transverse members 124 which extend inwardly and underlie the outwardly struck members 125 which are integral with the lever 105. The coil spring 126 is supported on and disposed around the axle 112. The ends 127 of the spring member 126 embrace the members 124 and 125 at either side thereof, urging them together to hold the lever 105 and the legs of the U-shaped member 113 in aligned position.

Thus, when lever 105 is swung about axle 112a, the resistance of the contacts 163 on the fixed contacts 165 will hold axle 112 against movement until lever 105 is far enough out of alignment with U-shaped member 113 to move member 125 away from inwardly struck member 124 to cause the ends of spring 126 to exert enough force between members 124 and 125 to snap contacts 163 out of fixed contacts 165. When the lever 105 tends to get out of alignment with the U-shaped member 113, the legs of the spring 126 will urge them to aligned position. The coil spring 128 is supported on the transverse portion 129 of the U-shaped member 113 when the upper edge 130 of the coil spring 128 urges the axle 112 into sliding engagement with the arcuate shaped portion 132 which is integral with the lever 105.

The cam members 140 are formed integral with the sliding bars 141 which have slots 142 and 143 in either end thereof. The slots 142 and 143 slide on the pins 145 and 146. The inwardly struck members 150 and 151 are struck inwardly from the side frame members 120 and the outwardly extending members 153 are integral with the slide members 141. The spring 154 is disposed around the pin 145 and a similar spring is disposed around the pin 146. The ends 155 of the spring 154 engage either side of the members 151 and 153, urging them together to urge the bars 141 to the position shown in Fig. 7. The contact carrying members 160 have holes 161 therein through which the axle 112 extends. The contact carrying members 160 are made from fibre board or other insulating material and have the copper contact members 163 carried thereon. The switch frame 164 has the fixed contacts 165 supported thereon for connection to the motor wires. When the contacts 163 are in the position shown, contact will be between the contacts 165 and movable contacts 163 and the circuit through those contacts will be completed. The circuit will not be complete through the contacts 168 and 163 on the other end of the switch. When the switch is moved to a neutral position, all the contacts 168 of both ends of the switch are open so a circuit to the other end will be complete. When the switch is moved to the extreme left position, the contacts on the extreme right end will be making contact.

When switch lever 105 is moved to the position shown in Fig. 7, the movable contacts 163 will be in the position shown and the axle 112 will be in the position shown below the end of cam 170. Since axle 112 is in engagement with cam 140, the ends 155 of the spring 154 will be urging the sliding member 141 to the position shown. When the operator moves the lever 105 to the left, axle 112 will first move out of notch 1a, the members 124 and 125 will be moved out of alignment, and the ends 127 of the spring 126 will urge the members 124 and 125 toward each other, thereby urging the member 113 into alignment with the lever 105. Since the axle 112 is restrained to move with the U-shaped member 113, it will be moved into the neutral position; that is, into the notch 180 between cams 170 and 182. In its movement from the position shown in Fig. 7 to the position in the notch 180, axle 112 will force cam 140 ahead of it to the right into engagement with the cam 182, thereby stopping the axle 112 from passing the cam member 182 and the axle 112 will be held down against cam 140 by cam surface 132 and be urged into engagement with the edge of cam surface 132 by the spring 128. Axle 112 will not be able to pass the member 140. When the force is removed from the lever 105, axle 112 will move back into notch 1a, thus moving upward above the cam 140 and allowing the cam 140 to be moved to the left past the axle 112 by the spring 154. When force is again applied to the lever 105, the axle 112 will be moved out of the notch 1a and past the cam 182 and as force is further applied to the lever 105 to move it further to the left to force the axle 112 out of the notch 180 and past the cam 182, the axle 112 will carry the contact carrying members 160 to bring the contacts 163 on the right hand end of the switch into engagement with the fixed contact members 168 to complete a circuit therethrough. It will thus be seen that in order to move the switch from the position shown in Figs. 6 and 7 to move the contacts out of engagement with the fixed contact members 168 on the left hand end of the switch through the intermediate position to bring the contacts 163 on the right hand end into engagement with the fixed contacts 168, it is necessary for the operator to release the force on the lever 105 at the intermediate position and allow the axle 112 to be moved upward by the spring 128 out of engagement with the cam 140 into notch 180. Then the operator will again exert a force to the left of the switch lever 105 to bring the axle 112 on past the cam 140 into engagement with the slot 185. In other words, when the switch is in the position shown in Fig. 6 with the motor running in one direction, it is impossible for the operator to move the switch directly from one extreme position to another without pausing in the intermediate position. While the operator is pausing in the intermediate position, the motor will be slowed down enough by the load of the vegetables in the peeler to bring the motor to a low enough speed that the switch 44 will close and when the switch lever 105 is moved on to the next position to reverse the current on the starting winding 42, a torque will be exerted on the motor in the opposite direction. By virtue of this switch not being movable from one extreme position to the other extreme poistion, it is possible for the operator to move the switch from one extreme position with the motor running in one direction, through the intermediate position pausing to let the motor slow down, then into the other extreme position to reverse the motor. If the switch were moved from one extreme position directly to the other, the motor would not reverse but continue to run in the same direction. Because the motor will drive the disk regardless of which direction from neutral the switch is moved, the operator will be inclined to move the switch in one direction an equal number of times to that moved in the opposite direction so that the disks will be worn an equal amount on the leading edge as on the trailing edge of the crests. Therefore, it has been discovered that the disks of a peeler driven by a motor as disclosed in the novel combination with my switch will last much longer than a disk which is driven by a center motor without the arbitrary reversing.

It has been found through experiments that an operator will throw the switch an equal number of times in either a right or a left direction, thereby causing equal wear on opposite sides of the crests 23 and 24 on the abradant disk 17 because of the change in rotation thereof. My novel switch makes my disk wear evenly, the vegetables are peeled uniformly, the life of the disk is doubled, and my peeler is adapted to be connected to any conventional source of A. C. power by merely changing three leads.

In the foregoing specification, I have set forth the invention in its preferred practical forms but I am aware that the structure shown is capable of modification within a range of equivalents without departing from the invention which is to be understood is broadly novel as is commensurate with the appended claim.

The embodiments of the invention in which an exclusive property or privilege is claimed are defined as follows:

A vegetable peeler comprising a container, a rotatable disk in said container having an abradant upper surface, said rotatable disk having radially extending rounded elevations and valleys equally spaced around the surface of said disk connected by smooth curves at the merging points thereof defining continuous rounded curves, a reversible electric motor, means for transferring rotative force from said motor to said disk, a reversing switch having a neutral position connecting said motor to a power supply, said switch being adapted to be thrown from an off to a first position to operate said motor in one direction whereby said disk rotates in one direction and said rounded elevations wear on one edge, said switch being movable from said first position through an off position to a second position whereby said motor drives said disk in another direction whereby said elevations wear on another edge, said switch comprising a switch body having a movable contact, spaced first and second fixed contacts, means to connect a power supply to said movable contact, lever means associated with said movable contact to move said movable contact into engagement with said first fixed contacts, an axle carried by said movable contact, said lever means having an arcuate portion to move said axle out of a notch in said body, a slide member slidably supported on said switch and having a cam member thereon for guiding said axle into said notch in said switch body when said lever means moves said movable contact out of engagement with said first fixed contacts, a cam on said switch body on each side of said notch whereby said axle and said movable contact are caused to pause before moving into engagement with said second fixed contacts whereby said motor is allowed time to slow down before said switch is moved to said second position, said switch adapted to be moved from said off to said second position whereby said motor is reversed on alternate operations of said switch.

References Cited in the file of this patent
UNITED STATES PATENTS

| | | |
|---|---|---|
| 942,932 | Robinson | Dec. 14, 1909 |
| 1,560,766 | Crites | Nov. 10, 1925 |
| 1,687,171 | McCathron | Oct. 9, 1928 |
| 1,727,417 | Soule | Sept. 10, 1929 |
| 2,219,878 | Turck | Oct. 29, 1940 |
| 2,667,308 | Hammes | Jan. 26, 1954 |
| 2,669,395 | Swisher | Feb. 16, 1954 |
| 2,678,775 | Simmons | May 18, 1954 |